United States Patent [19]

Sandig

[11] Patent Number: 4,820,408
[45] Date of Patent: Apr. 11, 1989

[54] DOUBLE VALVE APPARATUS
[75] Inventor: Bruce D. Sandig, Phoenix, Ariz.
[73] Assignee: Dial Manufacturing, Inc., Phoenix, Ariz.
[21] Appl. No.: 223,102
[22] Filed: Jul. 22, 1988
[51] Int. Cl.[4] ............................................. C02F 1/68
[52] U.S. Cl. .................................... 210/98; 210/101; 210/169; 210/198.1; 210/199; 137/895; 137/614.2; 137/101.11; 261/64.3; 261/64.4; 261/DIG. 75
[58] Field of Search ............ 210/169, 192, 199, 198.1, 210/98, 101; 137/895, 614.2, 614.21, 98, 101.11; 261/64.3, 64.4, DIG. 75

[56] References Cited
U.S. PATENT DOCUMENTS

| 2,147,568 | 2/1939 | Barber | 137/98 |
|---|---|---|---|
| 2,166,370 | 7/1939 | Putnam et al. | 137/101.11 |
| 2,707,480 | 5/1955 | Klosse | 137/101.11 |
| 3,220,430 | 11/1965 | Haskett | 137/895 |
| 3,504,685 | 4/1970 | Kleinmann | 137/98 |
| 3,552,568 | 1/1971 | Wade | 210/169 |
| 3,807,434 | 4/1974 | Rasmussen et al. | 210/169 |
| 3,976,220 | 8/1976 | de Kanter | 137/101.11 |

FOREIGN PATENT DOCUMENTS 2540650 8/1984 France ............................ 210/198.1

Primary Examiner—Richard V. Fisher
Assistant Examiner—Coreen Y. Lee
Attorney, Agent, or Firm—H. Gordon Shields

[57] ABSTRACT

Double valve apparatus is used in a swimming pool chlorinating system for injecting chlorine gas into a swimming pool when a swimming pool pump is operating. Two valve elements move on and off two valve seats for preventing air from bleeding back to the water pump when the pump is not operating and for preventing back pressure in the system from introducing water into the chlorine gas line.

8 Claims, 2 Drawing Sheets

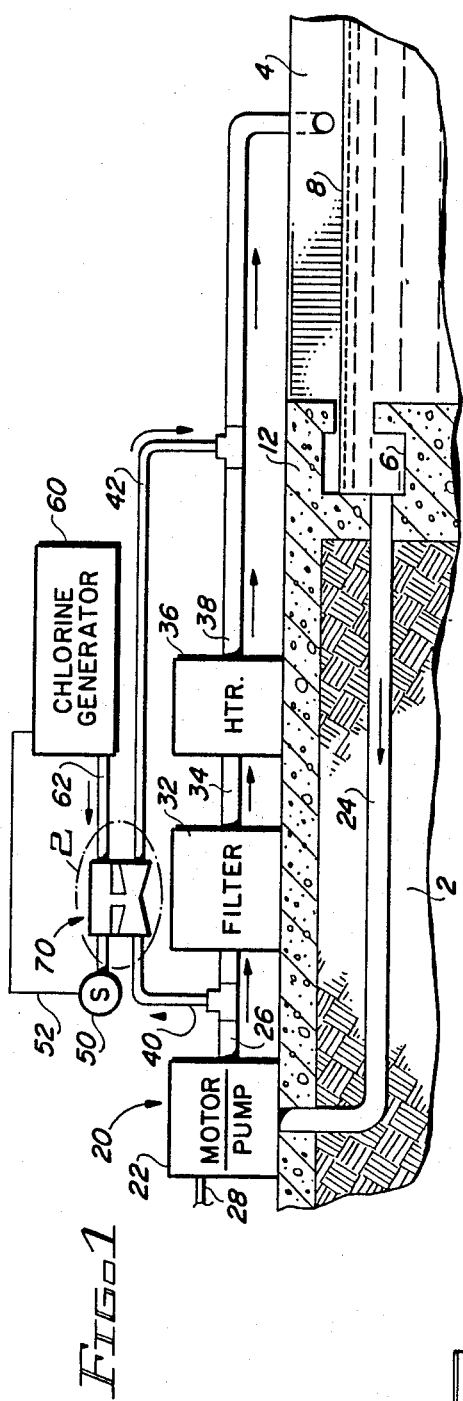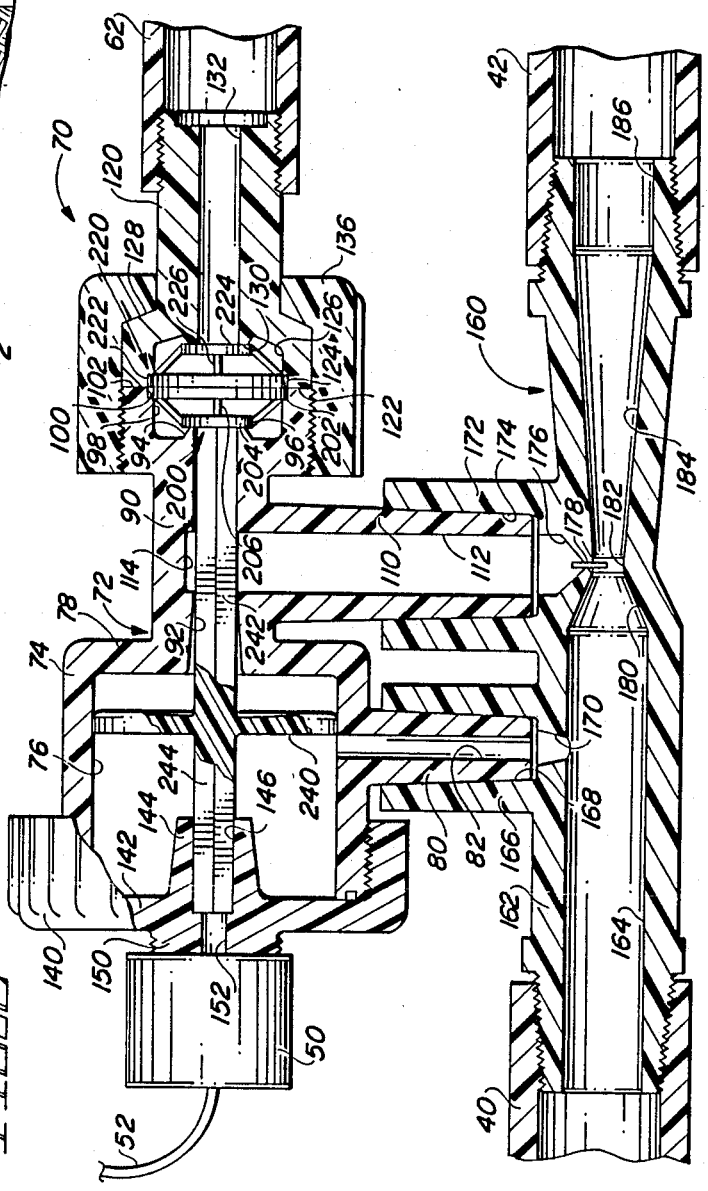

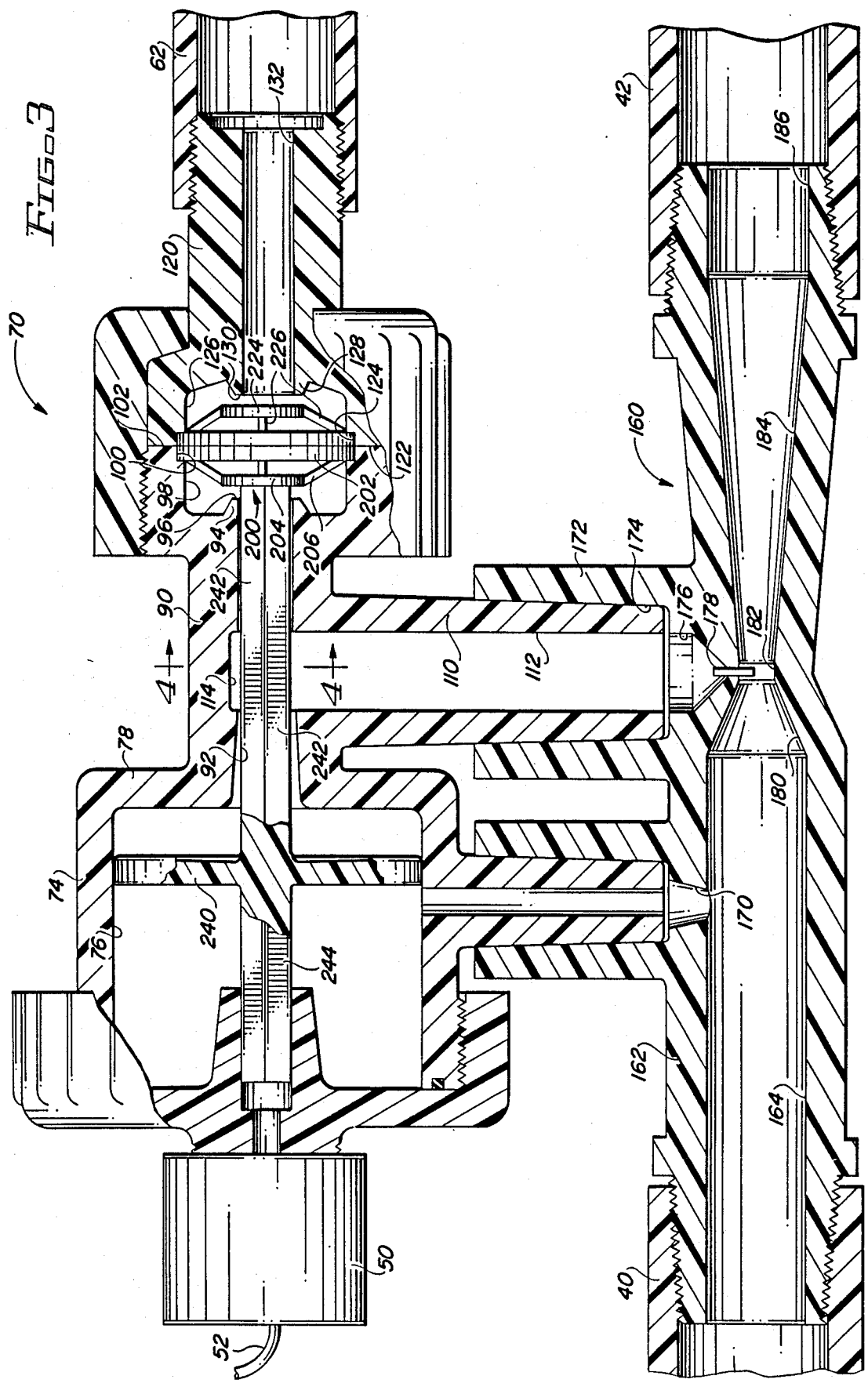

DOUBLE VALVE APPARATUS

BACKGROUND OF THE INVENTION

1. Field of the Invention

This invention relates to valve apparatus and, more particularly, to a double valve apparatus usable in a swimming pool environment for introducing chlorine gas into a water line when the swimming pool motor is on to pump water for the filtration system.

2. Description of the Prior Art

Chlorine gas is typically introduced into a swimming pool through a venturi. The venturi is disposed in the swimming pool water system generally downstream of the filter, the heater, and any other elements which may be in series with the swimming pool pump. Depending on the particular system, back pressure may allow water to flow into the chlorine line, or the system may lose prime if air is introduced into the system. That is, when the pump turns off, the venturi may cause air to be introduced into the system, thus allowing air to flow backwards through the pump, and the pump will then lose its prime.

The apparatus of the present invention overcomes the problems of the prior art by using pool water pressure to open a pilot valve, and the valve closes when the pressure is removed from the pilot valve. Positive pressure from the pump is required to open the valve. However, the valve closes merely by the vacuum pressure of the head of water in the line to prevent the introduction of air into the system. At the same time, a second valve also closes. Moreover, any back pressure in the system will also cause the second valve to close to prevent water from flowing backwards into the chlorine gas line.

SUMMARY OF THE INVENTION

The invention described and claimed herein comprises a double valve system coupled to a venturi in a swimming pool water line using positive pump pressure to open a pilot valve, and the pilot valve is closed by low pressure of vacuum pressure of the head of water draining in the system when the pump turns off. Back pressure is prevented from causing water to flow into the chlorine gas line by a second valve utilizing a second valve element. The valve elements move between two valve seats.

Among the objects of the present invention are the following:

To provide new and useful valve apparatus;

To provide new and useful double acting valve apparatus;

To provide new and useful valve apparatus having two valve elements movable between two valve seats;

To provide new and useful valve apparatus for controlling the flow of gas in a swimming pool water system;

To provide new and useful gas system in a swimming pool circuit;

To provide new and useful water system for a swimming pool; and

To provide new and useful chlorination system for swimming pools.

BRIEF DESCRIPTION OF THE DRAWING

FIG. 1 is a schematic diagram of the apparatus of the present invention in its use environment.

FIG. 2 is an enlarged view in partial section of the apparatus of the present invention taken generally from ellipse 2 of FIG. 1.

FIG. 3 is a view in partial section illustrating the sequential operation of the apparatus of FIG. 2.

FIG. 4 is a view in partial section taken generally along line 4—4 of FIG. 3.

DESCRIPTION OF THE PREFERRED EMBODIMENT

FIG. 1 is a schematic diagram illustrating the valve and venturi apparatus 70 of the present invention it its use environment. The use environment includes ground 2 in which is located a swimming pool 4. About the periphery of the swimming pool 4 is a trough 6. Water 8 is disposed within the swimming pool 4. A deck 12 surrounds the swimming pool, and may, if desired, extend outwardly therefrom.

A swimming pool water system 20 is schematically illustrated in conjunction with the pool 4. The swimming pool water system 20 includes a motor powered pump 22. A water line or conduit 24 extends through the trough 6 to the pump 22. For residential swimming pools, the water is typically pumped from a drain located at the bottom of the pool. Water 8 is pumped by the pump 22 from the trough 6 (or drain) through the water line 24. From the pump 22, a water line or conduit 26 extends to a filter 32. From the filter 32, a water line or conduit 34 is shown extending to a heater 36. From the heater 36, a water line or conduit 38 extends back to the swimming pool 4. It will be understood that all pools may not include a heater, and some pools may include other elements. However, such is immaterial to the present invention. The layout in FIG. 1 is merely schematic for purposes of illustrating a typical use environment for the apparatus of the present invention.

The pump 22 is an electrical pump, and is accordingly connected to a source of electrical current by appropriate electrical conductor(s) 28.

A branch water line or conduit 40 is connected to the line or conduit 26 to provide water from the pump 40 to the valve and venturi apparatus 70. The water line or conduit 40 extends specifically to the venturi portion of the apparatus 70.

A chlorine generator 60 generates chlorine for the swimming pool 4. Chlorine flows from the generator 60 through a conduit 62 to the valve and venturi apparatus 70 of the present invention. Chlorine flowing from the generator 60 to the valve and venturi apparatus 70 flows to the swimming pool 4 with the flow of water from the water line 40, as will be discussed in detail below in conjunction with FIGS. 2 and 3.

FIG. 2 is an enlarged view in partial section of the valve and venturi apparatus 70, taken generally from ellipse 70 of FIG. 1. In FIG. 2, the apparatus 70 is in its "off" state, as when no water or chlorine is flowing.

FIG. 3 is an enlarged view in partial section of the apparatus 70 of FIG. 2 in its "on" or operational state when the water and chlorine are both flowing.

For the following discussion of the operation of the valve and venturi apparatus 70 of the present invention, reference will primarily be made to FIGS. 2 and 3.

The valve and venturi apparatus 70 includes a valve body 72. The valve body 72 includes an end portion 74. The end portion 74 includes a bore 76 extending axially through it. The bore 76 terminates in an end wall 78. Extending radially outwardly from the end portion 74 is a connecting portion 80. The connecting portion 80 includes a bore 82 which communicates with the bore 76.

An adapter cap 140 is secured to the end portion 74. The adapter cap 140 includes an end wall 142. A boss 144 extends from the end wall 142 into the bore 76. The boss 144 includes a bore 146. A bore 152 extends through the end wall 142 and communicates with the bore 146. The bores 146 and 152 are axially aligned. The bore 146 has a larger diameter than that of the bore 152.

The bore 152 extends through the end wall 142 and outwardly through an external boss 150 of the cap 140. the boss 150 is externally threaded. A sensor 50 is secured to the boss 150. An electrical conductor(s) 52 extends from the sensor to the chlorine generator 60. The cap 140 is threadedly connected to the end portion 74.

The valve body 72 also includes a central portion 90. The central portion 90 is connected to the end portion 74 adjacent to the end wall 78. The central portion includes an axially extending bore 92. The axially extending bore 92 extends through the central portion 90 and through the end wall 78 of the end portion 74 to provide communication with the bore 76.

The valve body 72 also includes a central connecting portion 110. The central connecting portion 110 includes a bore 112 which in turn communicates with the bore 92 in the central portion 90. The bore 112 includes a top portion 114 which extends above the bore 92. This is also shown in FIG. 4.

The central portion 90 includes a boss 94 which extends into an end bore 98. The boss 94 includes an end face 96. The end face 96 is substantially perpendicular to the longitudinal axis of the bore 92. The end face 96 comprises a valve seat for a pilot valve.

At the outer end of the bore 98 is a shoulder or groove 100. The shoulder 100 extends circumferentially inwardly from an end face 102. The end face 102 comprises the outer end of the central portion 90 of the valve body 72.

An adapter block 120 matingly engages the end face 102. The adapter block 120 comprises a connecting portion between the valve body 72 and the conduit 62 from the chlorine generator 60. The adapter block 120 includes an end face 122 which is disposed against the end face 102 of the central portion 90. A shoulder 124 or groove extends inwardly from the end face 122. The shoulder 124 is substantially identical to, and accordingly comprises a mirror image of, the shoulder 100.

A bore 126 extends rearwardly from the shoulder 124. A boss 128 extends outwardly slightly into the bore 126. The boss 128 terminates in an end face 130. The end face 130 comprises a valve seat for a second valve. The boss 128, and its end face 130, are substantially identical to the boss 94 and its end face 96. As with the shoulders 100 and 124, the bosses 94 and 128 and the end faces 96 and 130, and the bores 98 and 126, are virtually mirror images of each other.

A bore 132 extends through the adapter block 120 and communicates with the bores 98 and 126.

The adapter block 120 is secured to the valve body 72 by a coupling element or union 136 by appropriately engaging threads.

Appropriately secured to the valve body 72 is a venturi block 160. The venturi block 160 includes an end portion 162. A bore 164 extends through the end portion 162. The conduit 40 is appropriately secured to the end portion 162 and communicates with the bore 164.

A connecting portion 166 extends upwardly from the venturi block 160 The connecting portion 166 includes a bore 168, and the connecting portion 80 of the valve body 72 extends into the bore 168. A bore 170 extends through the connecting portion 166 to provide communication between the bore 164 of the venturi block 160 and the bore 82 of the connecting portion 80.

The venturi block 160 also includes a central connecting portion 172 which receives the connecting portion 110 of the valve body 72. A bore 174 extends through the connecting portion 172 to provide communication with the bore 112 of the connecting portion 110.

Within the venturi block 160 and extending from the bore 164 is an inwardly tapering portion 180. The inwardly tapering portion 180 extends to a reduced diameter throat portion 182. From the throat portion 182, an outwardly tapering portion 184 extends to a cylindrical bore 186. The cylindrical bore portion 186 is generally of the same diameter as the bore 164, which is also of a generally cylindrical configuration.

A groove 178 extends radially outwardly and upwardly from about the center of the throat 182. A tapering bore portion 176 extends from the groove 178 to the bore 174.

It will be noted that the length of the throat 182 is relatively short as compared to the lengths of the tapering venturi bore portions 180 and 184. Moreover, it will be noted that the length of the slot or groove 178 is relatively large as compared to the length of the throat 182. As a matter of relative lengths, the slot is about two-thirds the length of the throat.

The slot or groove 178 is shown extending only about half way about the throat. However, the relative extent of the groove or slot 178 may vary, as desired or as practical.

A conduit 42 is appropriately connected to the bore 186 and extends from the venturi block 160 to the conduit or water line 38. (See FIG. 1.)

A pair of diaphragm elements 200 and 220 are disposed respectively in the shoulders 100 and 124 to control communication from the bores 92 and 132, respectively.

The diaphragm elements 200 and 220 are substantially identical. They are installed as mirror images of each other. They each include an outer ring 202 and 222, respectively, and a central diaphragm valve element 204 and 224, respectively. The diaphragm valve elements 204 and 224 are connected respectively to the rings 202 and 222 by a plurality of connecting webs 206 and 226, respectively. The plurality of webs 206 and 226 are flexible, thus allowing the central diaphragm elements 204 and 224 to move or to flex. However, the webs also provide a bias on the diaphragms to move the diaphragms to seat on the end faces of the bosses, as shown in FIG. 2.

The diameter of the central diaphragm valve elements 204 and 224 is slightly larger than the outer diameters of the bosses 94 and 128. the diaphragms 204 and 224 are disposed on the bosses, or rather on the end faces 96 and 130 of the bosses 94 and 128, respectively, in the closed position, as shown in FIG. 2.

A piston 240 is disposed in the bore 76 and is movable therein. A piston rod 242 is connected to one side of the piston 240 and extends through the bore 92. A second piston rod 244 is connected to the other side of the piston 240 and it extends through the bore 76 and into the bore 146 of the boss 144 of the cap 140.

The rods 242 and 244 are square, thus allowing fluid flow about them in their respective or various bores. FIG. 4, which is a view in partial section taken generally along line 4—4 of FIG. 3, shows the square configuration of the rod 242 in the bore 92.

FIG. 4 also shows the relative diameter of the bores 92 and 112, including the upper portion 114 of the bore 112. The diameter of the bore 112 is substantially greater than the diameter of the bore 92 to make certain that the flow of chlorine gas is free in the bore 92 and to the bore 112.

The rod 242 abuts the diaphragm valve element 204 to move the diaphragm valve element 204 off its seat. The rod 244 abuts the end wall 148, as required, as when the pump 22 is turned off an the piston 240 moves to the left, as viewed in FIG. 3, to the position shown in FIG. 2.

In operation, when the motor and pump 22 are operating, water flows from the trough 6 through the line 24 to the motor/pump 22, water is then pumped through the line 26 to the filter 32, the line 34, the heater 36, and the line 38 back to the swimming pool 4. Water also flows in the water line 40 from the water line 26 to the venturi block 160. The water flows through the bore 164, and through the venturi elements 180, 182, and 184 and to the bore 186 and to the conduit 42. The conduit 42 then flows to the conduit 38.

Water pressure from the bore 164 is communicated through the bore 170 to the bore 82, and to the bore 76, where the water pressure moves the piston 240 to the right, as viewed in FIG. 2. As the piston 240 moves to the right, the piston rod 242 bears against the diaphragm valve element 204. the diaphragm valve element 204 is then moved away from the end face 96 of the boss 94 as shown in FIG. 3. At the same time, water pressure from the bore 76 is communicated through the bores 146 and 152 to the sensor element 50. The sensor element 50 in turn provides an electrical signal through the conductor 52 to the chlorine generator 60.

A piston 240, and its piston rod 242, act as a pilot valve to actuate the diaphragm valve element 204.

The low pressure generated by the venturi elements 180, 182, and 184, causes the vacuum pressure to be transmitted through the slot or groove 178, the tapered bore 176, and the bore 112. The vacuum pressure is then transmitted through the bore 92 and into the bore 98. The vacuum pressure is also transmitted from the bore 98 to the bore 126. The vacuum pressure causes the diaphragm valve element 224 to unseat from against the end face or valve seat 130, and accordingly allows chlorine gas, which is under atmospheric pressure, to flow from the chlorine generator 60 and through the conduit 62.

With vacuum pressure on one side of the diaphragm valve element 224, and atmospheric pressure in bore 132 on the other side of the valve element 132, the valve element 132 moves against its inherent bias to open the bores 132 and 126 to each other. The bores 98 and 92 are also then in communication with the bores 126 and 132 for the flow of chlorine gas.

The chlorine gas is then drawn through the bores 126, 98, 92, 112, and 176, and the slot or groove 178 into the venturi at the throat 182. The gas, or course, moves into the water and flows with the water into the swimming pool 4.

When the pump 22 is turned off, water ceases to flow through the lines 26 and 40. The head of water in the valve apparatus 70 drains from the bore 76 and the bore 82 to the bore 164 and into the line 40. In place of the draining water, sufficient low pressure or vacuum pressure is pulled against atmospheric pressure to cause the piston 240 to move in the bore 76 to the left as shown in FIGS. 2 and 3, and thus the piston rod 242 is withdrawn from the bore 98 and allows the valve element 204 to seat against the end face 96. At the same time, the valve element 224 seats against its end face 130 by its own inherent bias, thus sealing off the bores 98 and 126. This, of course, prevents air from entering into the line 40 and accordingly prevents the pump 22 from losing its prime.

In case of a blockage virtually anywhere in the system that disturbs the vacuum, back pressure in the venturi elements causes water pressure to flow upwardly into the bore 112 and into the bore 92. The water pressure is also be communicated into the bore 76 between the piston 240 and the end wall 78. This would essentially put the same water pressure on both sides of the piston 240. The result is that the piston 240 again moves away from the valve element 204, and the valve element 204 of its own inherent bias seats against the end face 96. At the same time, the valve element 224 also seats against its end face 130, thus again sealing the bores 98 and 126.

As best illustrated in FIG. 4, which is a view in partial section taken generally along line 4—4 of FIG. 3, the square cross section of the piston rod 242 allows it to move in the bore 92 without sealing off the bore 92 to the flow of a fluid, such as chlorine gas, or a liquid such as water. At the same time, the larger diameter of the bore 112 and the extension 114 of the bore 112 above the bore 92, assures at all times that there will be communication between the bore 112 and the bore 92. Similarly, the square configuration to the piston rod 244 assures that there will be fluid communicating in the bore 146 and thus to the bore 152 and to the sensor 50.

The sensor 50 insures that the chlorine generator 60 is on, and generating chlorine, only when the pump 22 is operating. Only when there is a positive pressure communicated from the bore 76 to the bores 146 and 152 to the sensor 50 will the chlorine generator be on.

It will be noted that the sensor 50 is connected directly to the cap 140. However, it will be noted that a water line may be connected to the cap 140 and may extend from the cap 140 to the chlorine generator. The sensor 50 may then be located at the chlorine generator rather than at the valve and venturi apparatus 70, remotely from the chlorine generator. In either case, the function of the sensor is the same. The real issue is convenience and cost.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Valve and venturi apparatus in combination with a swimming pool having a chlorine generator to generate chlorine gas, comprising:
   pump means for pumping water from and to the swimming pool;

venturi means for receiving at least a portion of the water pumped by the pump means to the swimming pool, including
- a first bore portion into which the pumped water flows,
- a second bore portion communicating with the first bore portion,
- an inwardly tapering portion connected to the first bore portion,
- a throat portion connected to the inwardly tapering portion,
- an outwardly tapering portion connected to the throat, the inwardly tapering portion, the throat portion, and the outwardly tapering portion cooperating to provide vacuum pressure at the throat from the pumped water,
- a groove at the throat portion, and a third bore portion communicating with the groove; and valve means for controlling the flow of chlorine gas from the chlorine gas generator to the venturi means and for controlling the flow of water from the venturi means to the chlorine generator, including
- a first bore,
- a second bore communicating with the first bore and with the second bore portion of the venturi means,
- a third bore communicating with the first bore,
- a piston in the first bore and movable therein between the second and third bores in response to pumped water in the first and second bore portions and the second and first bores,
- a first piston rod secured to the piston and movable in the third bore in response to movement of the piston,
- a fourth bore extending between the third bore and the third bore portion for communicating the vacuum pressure from the throat portion, the groove, and the third bore portion to the third bore,
- valve bore means communicating with the third bore for receiving the flow of chlorine gas from the chlorine generator, including
  - a valve bore communicating with the third bore,
  - a first valve seat in the valve bore at the third bore,
  - a fifth bore communicating with the valve bore and receiving the flow of chlorine from the chlorine generator,
  - a second valve seat in the valve bore at the fifth bore,
  - first valve means seated on the first valve seat and movable away from the first valve seat in response to movement of the piston rod when water is pumped, and
  - second valve means seated on the second valve seat and movable away from the second valve seat in response to vacuum pressure from the pumped water through the venturi means to allow chlorine gas to flow from the chlorine generator through the fifth bore, the valve bore, the third bore, the fourth bore, the third bore portion, and the groove to the throat of the venturi means and to the pumped water through the venturi means.

2. The apparatus of claim 1 in which the first piston rod has a cross sectional configuration and the third bore has a cross sectional configuration, and the cross sectional configuration of the first piston rod is different from the cross sectional configuration of the third bore to allow chlorine gas to flow in the third bore to the fourth bore.

3. The apparatus of claim 1 in which the fourth bore includes
- a first bore portion extending from the third bore to the third bore portion, and
- a second bore portion for insuring communication between the third bore and the first bore portion of the fourth bore.

4. The apparatus of claim 1 in which the third bore has a first diameter and the fourth bore has a second diameter, and the second diameter is greater than the first diameter to insure the flow of the chlorine gas from the third bore into the fourth bore.

5. The apparatus of claim 1 in which the valve means further includes sensor means for sensing when the water is being pumped and for controlling the chlorine generator in response to the pumped water.

6. The apparatus of claim 5 in which the sensor means includes pressure sensing means connected to the first bore for sensing the pressure of the pumped water.

7. The apparatus of claim 5 in which the sensor means further includes
- end wall means closing the first bore;
- a boss on the end wall means extending into the first bore, and
- a sixth bore in the boss communicating between the first bore and the pressure sensing means.

8. The apparatus of claim 7 in which the valve means further includes a second piston rod connected to the piston and movable in the first bore and in the sixth bore of the boss.

* * * * *